March 24, 1931.   L. W. SHUTTS   1,797,799

SHOCK ABSORBER

Filed Nov. 20, 1928

Inventor
Leroy W. Shutts
By Spencer, Hardman and John
His Attorneys

Patented Mar. 24, 1931

1,797,799

UNITED STATES PATENT OFFICE

LEROY W. SHUTTS, OF DETROIT, MICHIGAN, ASSIGNOR TO GENERAL MOTORS RESEARCH CORPORATION, OF DETROIT, MICHIGAN, A CORPORATION OF DELAWARE

SHOCK ABSORBER

Application filed November 20, 1928. Serial No. 320,706.

This invention relates to improvements in shock absorbers and more particularly to apparatus of this character adaptable for use on motor vehicles to absorb shocks caused by obstructions in the surface of the roadway.

It is among the objects of the present invention to provide a shock absorber which will operate as satisfactorily at low temperatures as at higher temperatures, and in which the increasing viscosity of the fluid due to lower temperatures is compensated for.

Further objects and advantages of the present invention will be apparent from the following description, reference being had to the accompanying drawings, wherein a preferred embodiment of one form of the present invention is clearly shown.

Figure 1:
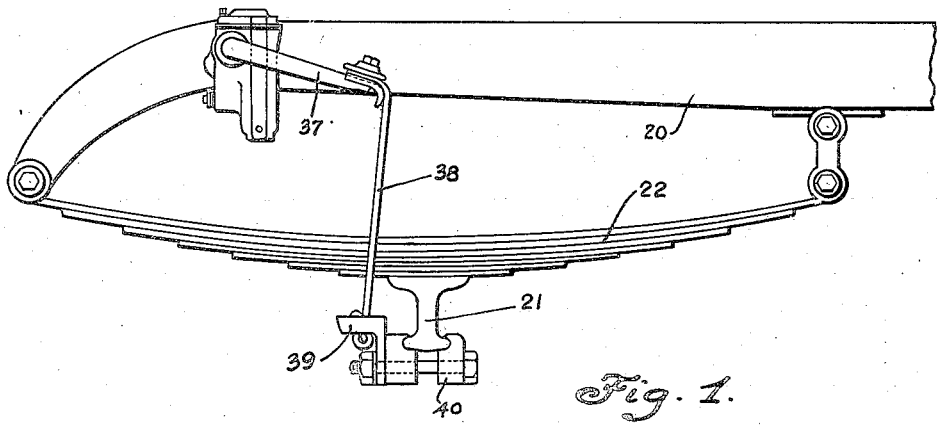
Fig. 1 is a diagrammatic fragmentary side view showing the vehicle frame and axle and one form of the present invention applied thereto.

Referring to the drawings, the numeral 20 designates the frame of the vehicle which is supported on the vehicle axle 21 by springs 22, one of which is shown.

The shock absorber comprises a casing 23, provided with screw threaded studs 24, by which the shock absorber is attached to the frame 20 of the vehicle. The casing 23 presents a cylinder 25, a main fluid chamber 26, and a by-pass chamber 27. The cap 28, fitted with a gasket 29, provides a fluid tight cover for the casing 23, said cap being attached to the casing by means of screws 30.

Figures 2, 3:
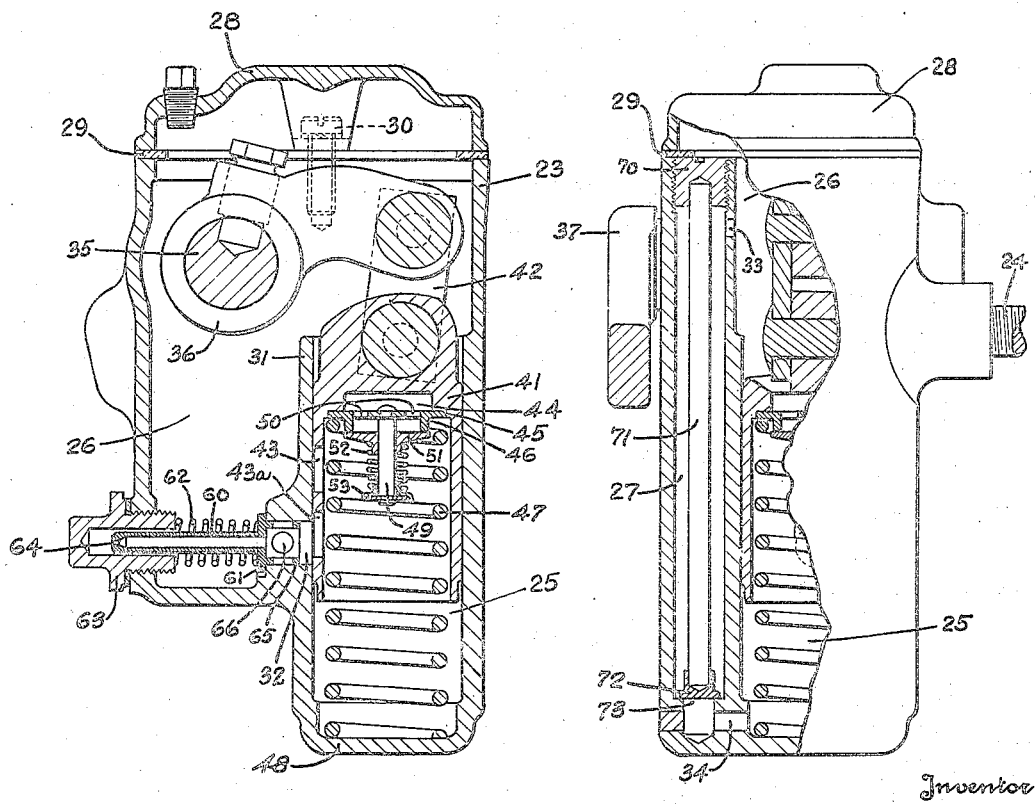
Fig. 2 is a vertical sectional view taken through the shock absorber.
Fig. 3 is an edge view of the shock absorber, a portion thereof being broken away to show the interior construction.

The partition 31 forms the cylinder 25 within the casing 23 and is provided with a port 32. The by-pass chamber 27 extending longitudinally of the casing, as shown in Fig. 3, is in communication with the fluid chamber 26 through a passage 33 at its one end, the other end of said by-pass chamber connecting with the cylinder 25 through passage 34.

The casing 23 supports a rocker shaft 35 upon which a rocker arm 36 is secured within the casing 23. The rocker shaft 35 has one end extending from the casing 23, said end being provided with an arm 37, the free end of which has one end of a strap 38 attached thereto, the other end of said strap being anchored to a bracket 39, which is attached to the axle 21 by the clamp 40.

Rocker arm 36 is connected with the piston 41 by links 42. The piston 41, reciprocatable in the cylinder 25, has two apertures 43 and 43a in its skirt portion which are adapted to align with the port 32 as the piston is reciprocated in the cylinder. The piston head has a passage 44 providing for the transfer of fluid from one side of the piston to the other. An annular groove 45 receives the valve seat member 46, which is maintained in said annular groove by the spring 47, one end of which engages the valve seat member 45, the other resting upon the closed end 48 of the cylinder 25. The valve seat member 46 supports a valve pin 49 substantially coaxial of the valve-seat member 46. A plurality of openings 50 are provided in the valve-seat member 46 about the valve stem 49. A valve 51 is slidably supported upon the valve stem 49, said valve being held yieldably in engagement with the valve-seat member 46 by a spring 52, one end of which rests upon the abutment collar 53, secured to the end of the valve stem 49. The valve just described provides for a substantially free flow of fluid from the fluid chamber 26 into the cylinder 25 in response to the movement of the piston toward the upper part of the casing, or more specifically, away from the end wall 48 of the cylinder 25.

Port 32 is provided with a spring loaded fluid controlling valve comprising a tubular body portion 60 having a flange 61, which is yieldably maintained in engagement with a valve seat provided on the partition 31, by a spring 62, one end of which engages with the recessed screw cap 63 into which the tubular member 60 extends. At the end of the tubular member extending into the recessed screw cap 63, there is provided an orifice 64, adapted to restrict the flow of fluid through the tubular member 60. The tubular member is of lesser transverse dimension than the recess in the screw cap 63 so that fluid escaping from the orifice 64 may flow through the space between the tubular member and the recess in the screw cap 63. On the side of the flange 61, opposite the tubular body portion 60, there is provided a cylindrical extension 65 fitting slidably into the port 32 and having transverse passages 66, which normally are closed by the walls of the port 32, as shown in Fig. 2. This valve structure just described provides for a restricted flow of fluid from the cylinder 25 to the fluid chamber 26 in response to the movement of the piston 41 downwardly into its cylinder, or more specifically, toward the closed end 48 of said cylinder 25. At ordinary pressures within the cylinder the flow of fluid is through the tubular body 60 and orifice 64 of the spring-loaded valve. The downward action of the piston causes the valve 51 to be closed tightly, which substantially prevents fluid from escaping through the piston head passage 34. The restricted flow of fluid from the cylinder 25 through the spring-loaded valve in the port 32 substantially resists the movement of the piston downwardly and thus the separating movement of the frame 20 and spring 22, is resisted and rebound shocks are consequenty absorbed. Excessive fluid pressure is relieved by the flange 61 being moved from its seat and opening passages 66 in accordance with the intensity of the pressure within the cylinder.

The upper end of the by-pass chamber 27 is screw threaded to receive a plug 70, to which is secured a thermostatic element 71, which may be of any suitable material capable of contracting at lowering temperatures. The thermostatic element 71 supports a valve 72, which in the normal operation of the shock absorber, or more specifically, at normal temperature closes a port 73 provided by the casing, which port connects with passage 34 leading to the cylinder 25. Suitable adjustment of the thermostatic element 71 is obtained by the operation of the screw plug 70, so that at the proper temperatures, the valve 72 may be seated to close port 73. At lower temperatures, or more specifically, at temperatures in which the viscosity of the fluid within the casing 23 is substantially increased, the thermostatic member 71 will have contracted sufficiently to move the valve 72 to open port 73, thereby establishing a fluid passage from the cylinder in addition to the fluid passage established by the spring-loaded valve in port 32.

Operation of the shock absorber for any considerable length of time will tend to heat the fluid within the casing and thus reduce its viscosity. The heat of the fluid tends to affect the thermostatic member 71 to move the valve 72 to restrict or close the port 73 and thus adjust its opening for the existing fluid temperature.

When the road wheels of the vehicle strike an obstacle in the roadway, the spring 22 is flexed toward the frame 20 and the strap 38 is consequently slackened, thereby permitting the spring 47 within the cylinder 25 to cause the piston to move upwardly toward the cover cap 28, and thus move the rocker arm and shaft 36 and 35 respectively, counter-clockwise. This counter-clockwise movement of the rocker shaft 35 moves the arm 37 counter-clockwise to take up the slack of strap 38. As the piston 41 moves upwardly, as mentioned, a substantially free flow of fluid is established through the piston passage 44, openings 50, past the valve 51, into the cylinder 25. As soon as the spring 22 has reached the limit of its flexure, it will have a tendency to return to its normal unflexed position with a sudden rebounding movement causing disagreeable shocks and jolts to be transmitted to the body of the vehicle, not shown, but ordinarily supported by the frame 20. To eliminate such shocks, the shock absorber immediately prevents the sudden return of spring 22. The returning movement of the spring exerts a clockwise movement through the lever arm 37, shaft 35, rocker arm 36, links 42, thus moving piston 41 downwardly into its cylinder 25, said piston exerting a pressure upon the fluid in the cylinder. As has been mentioned heretofore, the flow of fluid from the cylinder is ordinarily restricted by the spring-loaded valve in the port 32 and thus as the fluid is restricted, the movement of the piston is resisted and consequently the returning movement of the spring is likewise resisted.

If in cold weather the viscosity of the fluid becomes excessive, the shock absorber is of no substantial value for eliminating and absorbing shocks and jolts, inasmuch as the fluid cannot safely escape through the spring-loaded valve in port 32 in sufficient time. To compensate for this, applicant has provided a thermostatically controlled valve 72, which, as has been described, automatically presents an orifice for the escape of fluid from the cylinder, in addition to the regular fluid flow controlling valve, in response to proper low temperatures at which the fluid viscosity has increased beyond a safe limit.

Applicant's device is of simple structure and design, may be easily assembled into the shock absorber, and may be readily adjusted to meet varying requirements.

While the form of embodiment as herein disclosed, constitutes a preferred form, it is to be understood that other forms might be adopted, all coming within the scope of the claims which follow.

What is claimed is as follows:

1. A shock absorber, comprising in combination, a casing presenting a fluid chamber and a cylinder; a piston in said cylinder; ports providing for the flow of fluid from the cylinder into the fluid chamber in response to the movement of the piston in one direction; spring pressed means for restricting the flow of fluid through the one port; a valve normally closing the other port; and temperature controlled means for moving the second mentioned valve to establish an auxiliary flow of fluid from the cylinder to compensate for increases in viscosity of the fluid due to lowering temperatures.

2. A shock absorber, comprising in combination, a casing presenting a fluid chamber and a cylinder; a piston in said cylinder; means for reciprocating said piston; a port having a spring pressed valve adapted to establish a restricted flow of fluid from the cylinder to the fluid chamber in response to the movement of the piston in one direction; a second port; a valve normally closing said second port, but adapted to be moved to open said port for providing an additional connection between the cylinder and fluid chamber; and thermostatic means connected to said valve for opening said port to provide an additional flow of fluid from the cylinder when the viscosity of said fluid increases beyond a proper degree at lowering temperatures.

3. A shock absorber, comprising in combination, a casing presenting a cylinder, a main fluid chamber and an auxiliary chamber, said casing having ports providing communication between the cylinder and main fluid chamber and the auxiliary chamber and both the cylinder and main fluid chamber; a piston in said cylinder; means for reciprocating said piston; a spring-loaded valve in the port connecting the cylinder and main fluid chamber, said valve providing for a restricted flow of fluid from the cylinder to the main fluid chamber in response to the movement of the piston in one direction; a valve normally closing the port connecting the auxiliary chamber and the cylinder; and temperature controlled means within the auxiliary chamber and connected with the last mentioned valve, said means being adapted to move said valve for establishing an additional flow of fluid from the cylinder when the viscosity of the fluid has exceeded a proper value in response to lowering temperatures.

4. A shock absorber, comprising in combination, a casing presenting a cylinder and a fluid chamber; a piston in said cylinder; means for reciprocating said piston; a spring-loaded valve adapted to establish a restricted flow of fluid from the cylinder in response to the movement of the piston in one direction; and a separate, thermostatically controlled valve adapted to establish an additional flow of fluid from said cylinder in response to proper low temperatures at which the viscosity of the fluid increases.

5. A shock absorber, comprising in combination, a casing presenting a cylinder and a fluid chamber and having a port providing communication between the cylinder and the fluid chamber; a piston in the cylinder; means for operating said piston; a by-pass chamber in the casing communicating at one end with the fluid chamber and at the other end with the cylinder; a spring-loaded valve in the port adapted to establish a restricted flow of fluid from the cylinder to the fluid chamber in response to movement of the piston in one direction; a plug screw-threaded into the by-pass chamber; a thermostatic element carried by the plug; a valve supported by the thermostatic element normally to close said by-pass chamber from the cylinder, said thermostatic element, however, moving said valve to open communication between the cylinder and by-pass chamber when the temperature falls sufficiently to contrast the said element and consequently increase the viscosity of the fluid beyond a predetermined value.

In testimony whereof I hereto affix my signature.

LEROY W. SHUTTS.